United States Patent
Hancock et al.

(10) Patent No.: US 12,482,845 B2
(45) Date of Patent: Nov. 25, 2025

(54) FUEL CELL SYSTEM HAVING ACTIVE HOUSING PURGING

(71) Applicant: Airbus Operations GmbH, Hamburg (DE)

(72) Inventors: Kurtus Hancock, Hamburg (DE); Nikolaus Soukup, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 501 days.

(21) Appl. No.: 17/985,453

(22) Filed: Nov. 11, 2022

(65) Prior Publication Data
US 2023/0170504 A1 Jun. 1, 2023

(30) Foreign Application Priority Data
Nov. 29, 2021 (EP) .................................... 21211060

(51) Int. Cl.
*H01M 8/2475* (2016.01)
*B60L 58/32* (2019.01)
(Continued)

(52) U.S. Cl.
CPC ............ *H01M 8/2475* (2013.01); *B60L 58/32* (2019.02); *H01M 8/04089* (2013.01);
(Continued)

(58) Field of Classification Search
CPC .................... H01M 2250/20; H01M 8/0662
See application file for complete search history.

(56) References Cited

U.S. PATENT DOCUMENTS

| | | | | |
|---|---|---|---|---|
| 5,346,778 | A * | 9/1994 | Ewan | H01M 8/04552 429/515 |
| 2005/0058861 | A1* | 3/2005 | Pettit | H01M 8/04014 429/441 |

(Continued)

FOREIGN PATENT DOCUMENTS

| | | |
|---|---|---|
| JP | 2006147151 A | 6/2006 |
| JP | 2007073455 A | 3/2007 |

OTHER PUBLICATIONS

European Search Report dated May 13, 2022; priority document.

*Primary Examiner* — Matthew W Van Oudenaren
(74) *Attorney, Agent, or Firm* — Greer, Burns & Crain, Ltd.

(57) ABSTRACT

A fuel cell system including a fuel cell stack having cathode and anode sides, a housing surrounding the fuel cell stack, a housing purging air inlet, an air-conveying installation disposed on the housing purging air inlet, a housing purging air outlet, an oxidation catalyst, a temperature sensor, and a control unit. The air-conveying installation continuously directs an airflow into the housing purging air inlet. The oxidation catalyst is disposed downstream of the housing purging air outlet and catalytically combusts hydrogen and oxygen. The temperature sensor is disposed on the oxidation catalyst and detects the oxidation catalyst temperature as an information item pertaining to a volumetric hydrogen flow occurring outside a fuel cell process and to be discharged. The control unit couples to the temperature sensor and to the air-conveying installation and receives the temperature detected by the temperature sensor and to therefrom determine variations of a hydrogen concentration.

10 Claims, 3 Drawing Sheets

(51) Int. Cl.
*H01M 8/04089* (2016.01)
*H01M 8/04223* (2016.01)
*H01M 8/0432* (2016.01)
*H01M 8/0438* (2016.01)
*H01M 8/0444* (2016.01)
*H01M 8/04746* (2016.01)
*H01M 8/0662* (2016.01)

(52) U.S. Cl.
CPC ... *H01M 8/04231* (2013.01); *H01M 8/04365* (2013.01); *H01M 8/0438* (2013.01); *H01M 8/0444* (2013.01); *H01M 8/04746* (2013.01); *H01M 8/0662* (2013.01); *B60L 2200/10* (2013.01); *H01M 2250/20* (2013.01)

(56) References Cited

U.S. PATENT DOCUMENTS

| | | | |
|---|---|---|---|
| 2007/0065711 A1* | 3/2007 | Gopal | H01M 8/249 429/432 |
| 2008/0001026 A1* | 1/2008 | Hoffjann | H01M 8/04007 4/316 |
| 2009/0016401 A1* | 1/2009 | Hamada | F23N 5/242 374/10 |

* cited by examiner

FUEL CELL SYSTEM HAVING ACTIVE HOUSING PURGING

CROSS-REFERENCES TO RELATED APPLICATIONS

This application claims the benefit of the European patent application No. 21211060.5 filed on Nov. 29, 2021, the entire disclosures of which are incorporated herein by way of reference.

FIELD OF THE INVENTION

The present specification relates to a fuel cell system as well as to a vehicle having such a fuel cell system.

BACKGROUND OF THE INVENTION

In fuel cells having a polymer-electrolyte membrane, minor leakages relating to the construction mode often arise, as a result of which a minor volumetric flow of hydrogen can escape. Consequently, an interior space of a housing that surrounds the fuel cell, or a directly adjacent environment, may have a certain concentration of hydrogen. With a view to the safety of a superordinate system, for example of a vehicle in which the fuel cell is integrated, it is expedient for any excessive concentration of hydrogen to be avoided. To this end, it is known for the environment of a fuel cell to be continuously ventilated. This is sufficient in order to compensate for any minor flow of leakage to be anticipated.

In order to avoid any excessive accumulation of nitrogen and water in the fuel cell, a continuous or periodic purging procedure is carried out on the anode side. In the process, nitrogen and water are directed into an exhaust line of the fuel cell. However, a certain volumetric flow of hydrogen may make its way into the exhaust line in the process.

Brief, more intensive ventilation is required in the event of failures during which a larger volumetric flow may be created. It is known for the ventilation to be provided by an additional fan, and for the operation of the fuel cell to be interrupted. It is furthermore known for a compressed flow of fresh air, which is assigned to the fuel cell and necessary for the operation of the fuel cell, to be used exclusively or partially for the purpose of ventilation in this instance.

SUMMARY OF THE INVENTION

It can be considered that an object of the invention lies in proposing an alternative fuel cell system in which any excessive concentration of hydrogen in a housing or an environment can be prevented.

Proposed is a fuel cell system, having at least one fuel cell stack having a cathode side and an anode side, a housing which surrounds the at least one fuel cell stack, a housing purging air inlet, an air-conveying installation which is disposed on the housing purging air inlet, a housing purging air outlet, an oxidation catalyst, at least one temperature sensor, and a control unit, wherein the air-conveying installation is configured to continuously direct an airflow into the housing purging air inlet, wherein the oxidation catalyst is disposed downstream of the housing purging air outlet and is configured to catalytically combust hydrogen and oxygen, wherein the at least one temperature sensor is disposed on the oxidation catalyst and is configured to detect the temperature of the oxidation catalyst as an item of information pertaining to a volumetric flow of hydrogen that occurs outside a fuel cell process and is to be discharged, and wherein the control unit is coupled to the at least one temperature sensor and to the air-conveying installation and is configured to receive a temperature detected by the at least one temperature sensor and to therefrom determine variations of a concentration of hydrogen.

The at least one fuel cell stack may have a multiplicity of individual polymer-electrolyte membrane fuel cells (PEMFC) in which the membrane therein separates an anode from a cathode. The fuel cells overall or in groups, depending on the requirement, are electrically connected in series and/or in parallel. PEM fuel cells are technically mature and can be reliably operated at comparatively low and high temperature levels. Owing to comparatively low temperature levels, these fuel cells can, in particular, be used without hesitation for a permanent use also in vehicles for transporting passengers.

A continuous inflow of reactants is required for operating the fuel cell. During the normal operation, fresh air as an oxidant for the fuel cell process is fed at the cathode side. To this end, a compressor can be provided, an intercooler optionally being disposed downstream thereof. In contrast, hydrogen which emanates from an external hydrogen source is provided at the anode side.

The housing encloses the at least one fuel cell stack and guides necessary lines from outside the housing, through a housing wall, to the at least one fuel cell stack. This can include a hydrogen line, an air line, an exhaust air line, an infeed line and a return line of a cooling device, at least one electrical current line, and optionally a control line. Apart from the at least one fuel cell stack, further components such as, for instance, various valves, a water separator or similar, can be provided within the housing.

The housing purging air outlet may be disposed on an upper end of the housing. The term "upper" here is to be understood in such a manner that the respective region of the housing, in the normal operation of the superordinate system in which the fuel cell system is integrated, is situated above other regions of the housing. Since hydrogen is lighter than air, the hydrogen could readily escape through this housing purging air outlet without inevitably requiring active purging. Residual hydrogen can make its way into the housing purging air outlet, in particular in a standby state in which the air-conveying installation is out of operation.

The housing purging air inlet may be disposed on a lower end of the housing and preferably in a region that lies opposite the housing purging air outlet. The housing purging air inlet is provided for actively directing air into the housing by way of the air-conveying installation, so as to purge the interior of the housing such that a concentration of hydrogen in the interior of the housing is minimized. A positive pressure, which leads to gas flowing out of the housing purging air outlet, is created in the interior of the housing during purging. In this way, hydrogen contained in the interior of the housing is purged from the latter, or diluted.

The oxidation catalyst can also be referred to as a catalytic recombiner and functions as a passive safety device. In the oxidation catalyst, hydrogen is converted to water under the effect of a catalytically active material with oxygen. This could take place at the ambient temperature. It may also be expedient for the oxidation catalyst to be heated at several operating points, in particular when air and hydrogen do not occur at temperatures at which the reaction rate is sufficient for complete oxidation. This could be implemented, for instance, with the aid of an electric heater which can also be integrated directly in the oxidation catalyst. Consequently, hydrogen flowing from the housing purging air outlet is directly converted and cannot be ignited. Heat is created in the oxidation catalyst during this process.

The at least one temperature sensor can measure the temperature increase created by the heat. A measured temperature increase here is a direct function of the volumetric flow of hydrogen. The higher the quantity of heat created at the oxidation catalyst, the higher also the volumetric flow of hydrogen that is converted in the oxidation catalyst. Consequently, the size of the flow of hydrogen which as a result of purging flows into the housing purging air outlet can be determined indirectly, by measuring the temperature of the oxidation catalyst. The detection of the temperature here is significantly faster than the detection of hydrogen by means of a hydrogen sensor on the housing purging air outlet. By detecting variations in the recorded temperature, the control unit can ascertain whether a concentration of hydrogen in the interior of the housing varies. Consequently, the fuel cell system according to the invention makes it possible to directly eliminate hydrogen created during a purging procedure, and to simultaneously detect the size of the actual volumetric flow of hydrogen using a very simple technique, such that servicing of the fuel cell system, or a restriction of the operation of the latter, can be initiated.

The at least one temperature sensor may be disposed in an outlet pipe which directly succeeds the oxidation catalyst. For example, the outlet pipe may represent a dedicated hydrogen funnel through which hydrogen automatically flows out already by virtue of the lower density. Therefore, the outlet pipe is preferably disposed on an upper end of the housing. The oxidation catalyst can be disposed in the outlet pipe, ahead of the latter, or between two successive outlet pipes. The at least one temperature sensor here is disposed in such a manner that an unimpeded outflow of the gas from the outlet pipe is made possible.

The fuel cell system may furthermore have a flashback arrester which is disposed upstream of the oxidation catalyst and is configured to prevent any ignition of hydrogen upstream of the flashback arrester. The flashback arrester can be a deflagration arrester and be implemented in various ways. In the case of upstream pipelines which are straight, it may be expedient for a diameter-to-length ratio to be restricted in order for the effect of the flashback arrester to be assisted.

The fuel cell system may furthermore have an anode purging device, coupled to the control unit, for purging the anode side of the at least one fuel cell stack, wherein the anode purging device has at least one purging valve which is disposed between an anode outlet and the oxidation catalyst, and wherein the control unit, by selectively opening the at least one purging valve, is configured to direct a flow of hydrogen through the anode side to the oxidation catalyst, in order for the anode side to be purged. The purging valve may be switched between an open state and a closed state. A fluidic connection between a hydrogen infeed at the anode side and the anode outlet by way of the anode side is established by opening the purging valve. Fluid which is situated in the anode side is conveyed out of the latter by a continuous inflow of hydrogen into the anode side. In this way, water and nitrogen accumulated on the anode side can be removed. However, it cannot be avoided in the process that a certain volume of hydrogen, which is not available for the fuel process, also flows out of the anode side. By directing the purging gas into the housing purging air outlet, the hydrogen can be rendered harmless directly by the oxidation catalyst. For example, the control unit can open an assigned purging valve at specific temporal intervals. In this way, a flow through the respective anode is made possible.

The at least one fuel cell stack may comprise a plurality of fuel cell stacks, wherein the at least one purging valve comprises a plurality of purging valves which are coupled to different fuel cell stacks, and wherein the control unit is configured to open the plurality of purging valves successively and/or not simultaneously. For example, each fuel cell stack may be assigned an individual purging valve. However, groups of fuel cell stacks, which are equipped with a common purging valve, may also be provided. One fuel cell stack may also have two or more purging valves, for example in order for the volumetric flow for purging to be influenced. It is particularly preferable for the plurality of purging valves not to be simultaneously opened. For example, a temporal sequence in which all of the purging valves are opened and closed again in a specific order may be provided. In this way, the individual fuel cell stacks may be successively purged, for instance. This results in a continuous, additional input of hydrogen at the oxidation catalyst, by way of which the temperature at the oxidation catalyst can increase by a specific amount. In the case of continuous purging of the fuel cell stacks in succession or in a specific sequence, for example such that there is no point in time at which all of the purging valves are closed, the consequence is a continuous, additional thermal input into the oxidation catalyst. The additional input of hydrogen is particularly preferably uniform such that a continuous, approximately consistent input of hydrogen takes place. Consequently, variations in the concentration of hydrogen in the interior of the housing may be determined in a very simple manner, even when directing purging gases into the oxidation catalyst.

The control unit may be configured to determine from a measured temperature of the at least one temperature sensor a momentary concentration of hydrogen of a gas mixture flowing into the oxidation catalyst. Apart from the examination of variations in the concentration, an actual, momentary content of hydrogen may be determined by a corresponding algorithm Further variables may be used in the process, for example a total volumetric flow of gas flowing through the oxidation catalyst, and a gas temperature upstream of the oxidation catalyst. It is conceivable that further variables may be necessary or expedient in order for a precise calculation to be carried out.

The control unit may be configured to influence the operation of the air-conveying installation as a function of the determined concentration of hydrogen. In this way, the active purging of the housing could be intensified when the concentration of hydrogen is increased. In contrast, if no hydrogen, or only a very low proportion of hydrogen, is able to be determined in the interior of the housing, the air-conveying output may also be reduced in terms of its output, or switching to entirely passive purging may also take place. It may be expedient here for the housing purging air outlet to be disposed in such a manner that, as a result of outflowing purging gases or as a result of the presence of hydrogen in the housing per se, an escape under the effect of gravity takes place, ambient air being inducted through the housing purging air inlet under the influence of a negative pressure which arises in this instance.

The control unit may be configured to at least temporarily close the at least one purging valve, and, with the at least one purging valve closed, to determine the momentary concentration of hydrogen in the interior of the housing. By closing the at least one purging valve, a concentration of hydrogen in the interior of the housing can be determined in isolation. A corresponding actuation of the air-conveying output could then be made dependent on the concentration of hydrogen detected in this period of time.

The control unit may be configured to compare the momentary concentration of hydrogen in the interior of the housing with a tolerable value and, if the tolerable value is exceeded, to increase a volumetric flow of air provided by the air-conveying installation. For example, the air-conveying output could be operated, in particular, so as to be constant. The output of the air-conveying installation could be increased only once a corresponding, tolerable value has been exceeded.

The control unit may be configured to operate the fuel cell system with a reduced output if the momentary concentration of hydrogen in the interior of the housing exceeds a pre-definable threshold value. Consequently, should the concentration of hydrogen exceed a threshold value, which may be significantly above the tolerable value mentioned above, this could be considered to be an indication of a technical malfunction. In this instance, it is expedient for the output of the fuel cell system to be reduced such that the hydrogen infeed is likewise reduced. In this instance, the control unit could generate a maintenance alert, for example, and communicate the latter externally or file the latter in an electronic logbook.

The invention furthermore relates to a vehicle, having at least one fuel cell system according to the above specification.

The vehicle may be an aircraft. The fuel cell system, for providing electric power, could be an addition or an alternative to aircraft engine generators.

BRIEF DESCRIPTION OF THE DRAWINGS

Exemplary embodiments will be discussed in more detail hereunder by means of the appended drawings. The illustrations are schematic and not to scale. Identical reference signs relate to identical or equivalent elements. In the drawings.

DETAILED DESCRIPTION OF THE PREFERRED EMBODIMENTS

Figure 1:
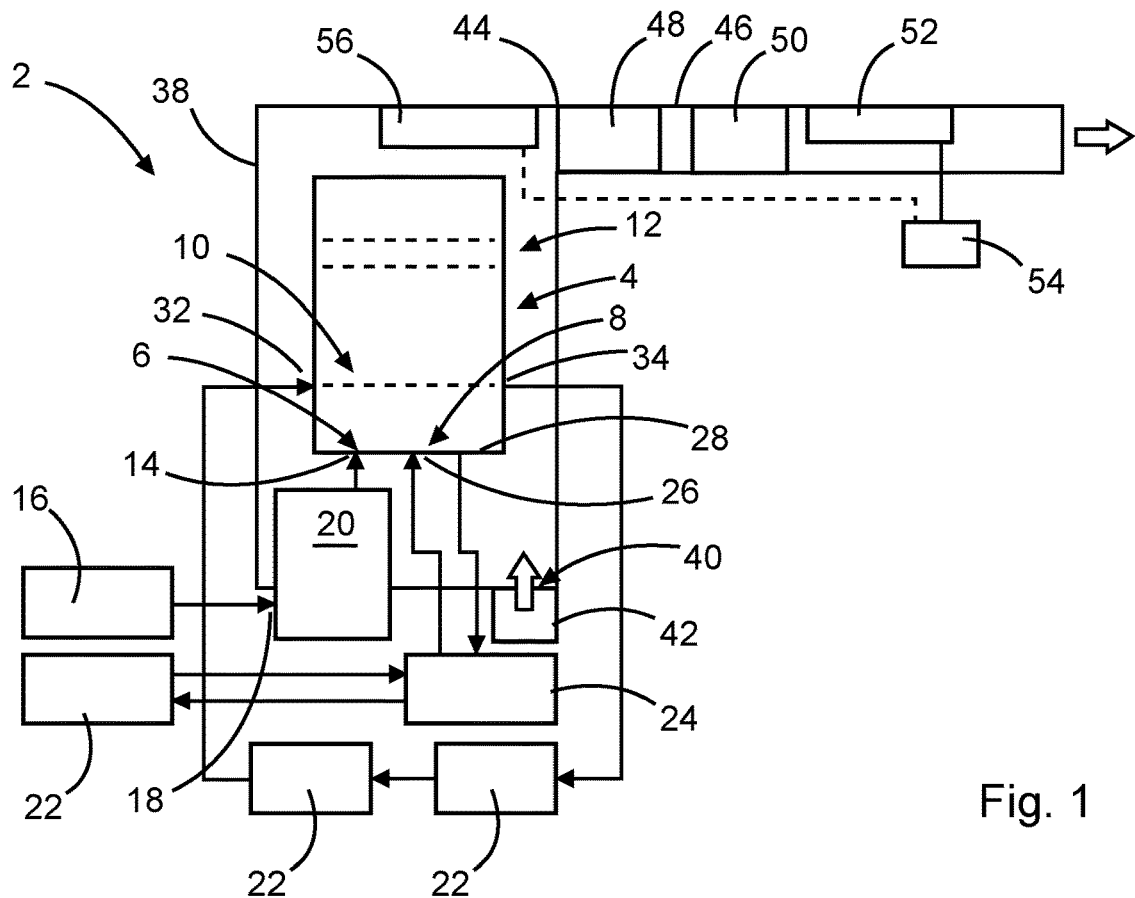
FIGS. 1-5 show schematic illustrations of a fuel cell system in a plurality of variants.

FIG. 1 shows a fuel cell system 2 having a fuel cell stack 4 which comprises an anode side 6, a cathode side 8, a heat transfer element 10, and an electric terminal 12. It is noted here that the fuel cell stack 4 presently is only schematically illustrated and is, in fact, composed of a series of fuel cells which by means of bipolar plates are electrically connected to one another and supplied with reactants.

The anode side 6 at an anode inlet 14 is supplied with hydrogen which emanates from a hydrogen source 16 which, by way of a hydrogen connector 18, is connected to the fuel cell system 2. One or a plurality of hydrogen valves 20, which, by actuation, is/are configured to deliver in a metered manner fresh hydrogen to the anode inlet 14, adjoins/adjoin the hydrogen connector 18. This assembly, optionally having further components, is referred to as a "balance of plant".

Air from an air source 22, which is humidified by a humidifier 24 in order to guarantee the integrity of a membrane situated in the fuel cell stack 4, is fed to the cathode side 8. The pre-humidified air makes its way into a cathode inlet 26. After a proportion of oxygen has been consumed, exhaust air from a cathode outlet 28 makes its way into the humidifier 24 and in the latter dispenses water vapor to the fresh intake air.

For example, the heat transfer element 10 may be integrated in the previously mentioned bipolar plates, and by means of a pump 30 is passed through by a flow of coolant. To this end, the coolant flows into a coolant inlet 32, is heated in the fuel cell stack 4, and flows out again from a coolant outlet 34. The heat absorbed by the coolant can be discharged to the environment again by way of a heat exchanger 36.

The fuel cell system 2 furthermore has a housing 38 which here, in an exemplary manner, encloses the fuel cell stack 4 and the hydrogen valves 20. The housing 38 may preferably be designed as compact as possible and provide an available interior space which is not unnecessarily large. The housing 38 on the lower side thereof has a housing purging air inlet 40 on which is provided an air-conveying installation 42 which actively directs ambient air into the housing 38. The ambient air leads to the gas situated in the housing 38 being purged out of a housing purging air outlet 44, the latter in an exemplary manner being disposed on the upper side thereof. This housing purging air outlet 44 may open into a corresponding outlet pipe 46.

A flashback arrester 48, which is adjoined by an oxidation catalyst 50, is disposed in the outlet pipe 46. A temperature sensor 52 is disposed directly downstream. Hydrogen which flows through the housing purging air outlet 44 is converted to water with oxygen by the oxidation catalyst 50, while generating heat. The temperature sensor 52 here detects the temperature of the exhaust gas downstream of the oxidation catalyst 50, such that a control unit 54, which is coupled to the temperature sensor 52, by means of the detected temperature can determine a variation of a concentration of hydrogen or a level of the concentration of hydrogen. A hydrogen sensor 56, which is likewise coupled to the control unit 54, can additionally also be disposed within the housing 38.

Figure 2:
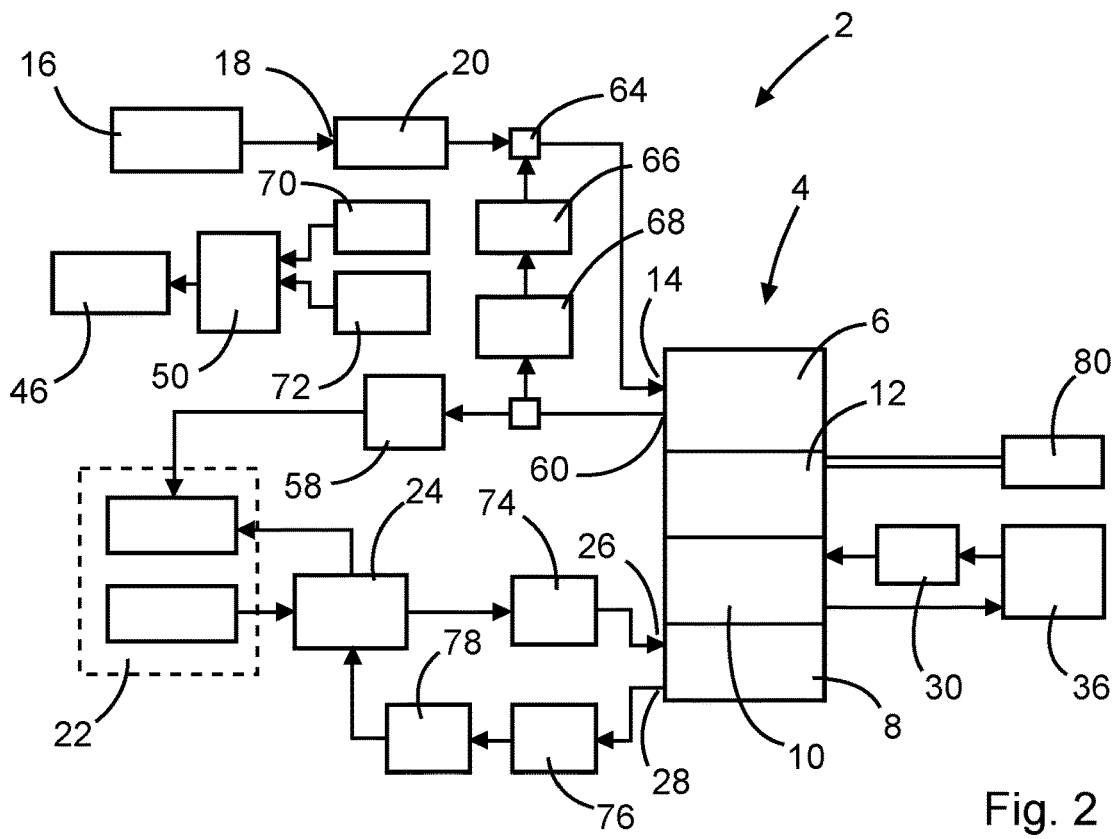

FIG. 2 shows a somewhat modified view in a schematic block diagram, in which even more details are apparent. A purging valve 58, which is coupled to an anode outlet 60, can be utilized for purging the anode side 6 if required, in particular for removing nitrogen and water from the fuel cells. To this end, the purging valve 58, which can be connected to the control unit 54, is connected to an outlet 62 which supplies the purging gas to the environment.

With the purging valve 58 closed, residual hydrogen gas from the anode outlet 60 makes its way into a mixing point 64 where fresh hydrogen is added to the residual hydrogen gas, the mixture flowing to the anode inlet 14. The mixing point 64 may also be embodied as a jet pump. In order for the residual hydrogen gas to be conveyed, a recirculation fan 66 is coupled to the anode outlet 60 such that a recirculating circuit is formed. Additionally provided here is a water separator 68 which is disposed upstream of the mixing point 64 and at least partially dehumidifies the anode exhaust gas, or separates condensate from a supply line, respectively.

In the oxidation catalyst 50, leaked hydrogen 70, which accumulates in the interior of the housing 38, is combined with fresh intake air 72, the latter making its way into the housing 38 by way of the air-conveying installation 42, so as to form water. Consequently, air with water vapor contained therein is directed to the outside by way of the outlet pipe 46.

Furthermore, by way of example, a first switch-off valve 74 is disposed downstream of the humidifier 24. A second switch-off valve 76 is disposed downstream of the cathode output 28. In order for the fuel cell system 2 to be switched off, the two switch-off valves 74 and 76 can be closed in addition to the hydrogen valves 20. A water separator 78, which separates water from the cathode exhaust air and, in an exemplary manner, supplies the water to the humidifier 24, is disposed downstream of the second switch-off valve 76.

An electric load 80 is connected to the electrical terminal 12 and is supplied with electric power from the latter.

Figure 3:
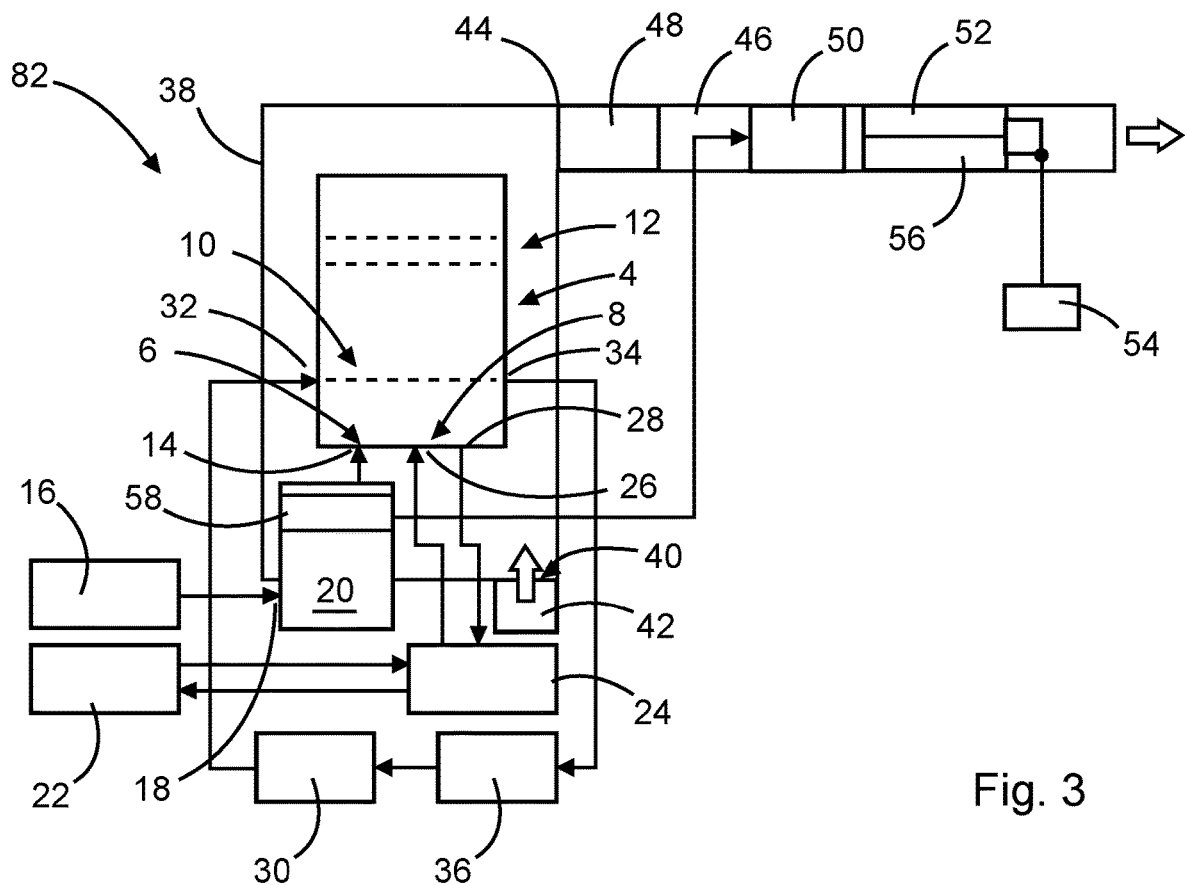
Figure 4:
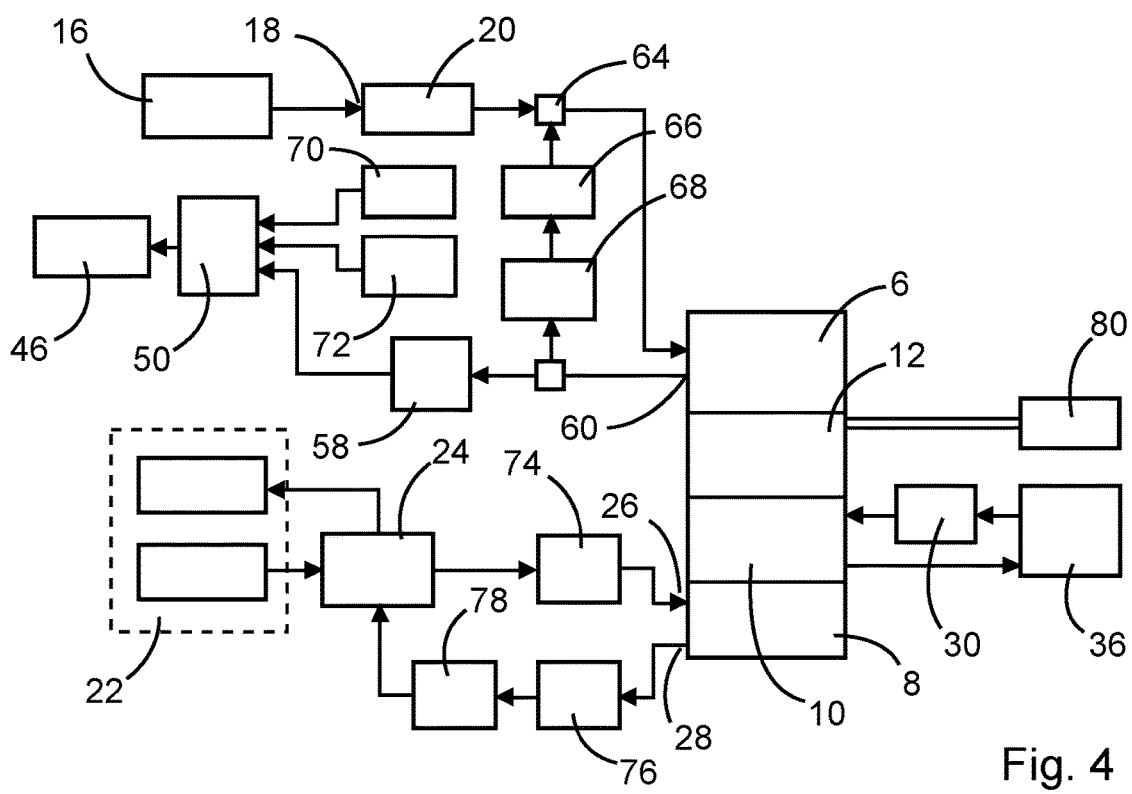

A somewhat modified fuel cell system 82 is shown in FIGS. 3 and 4. The purging valve 58 here is fluidically connected to the oxidation catalyst 50. This means that purging gases from the fuel cell stack 4 are guided directly into the outlet pipe 46 and rendered harmless by the oxidation catalyst 50. The temperature of the gas flowing out into the environment may increase somewhat further as a result. By way of example, the hydrogen sensor 56 is disposed downstream of the oxidation catalyst 50.

Figure 5:
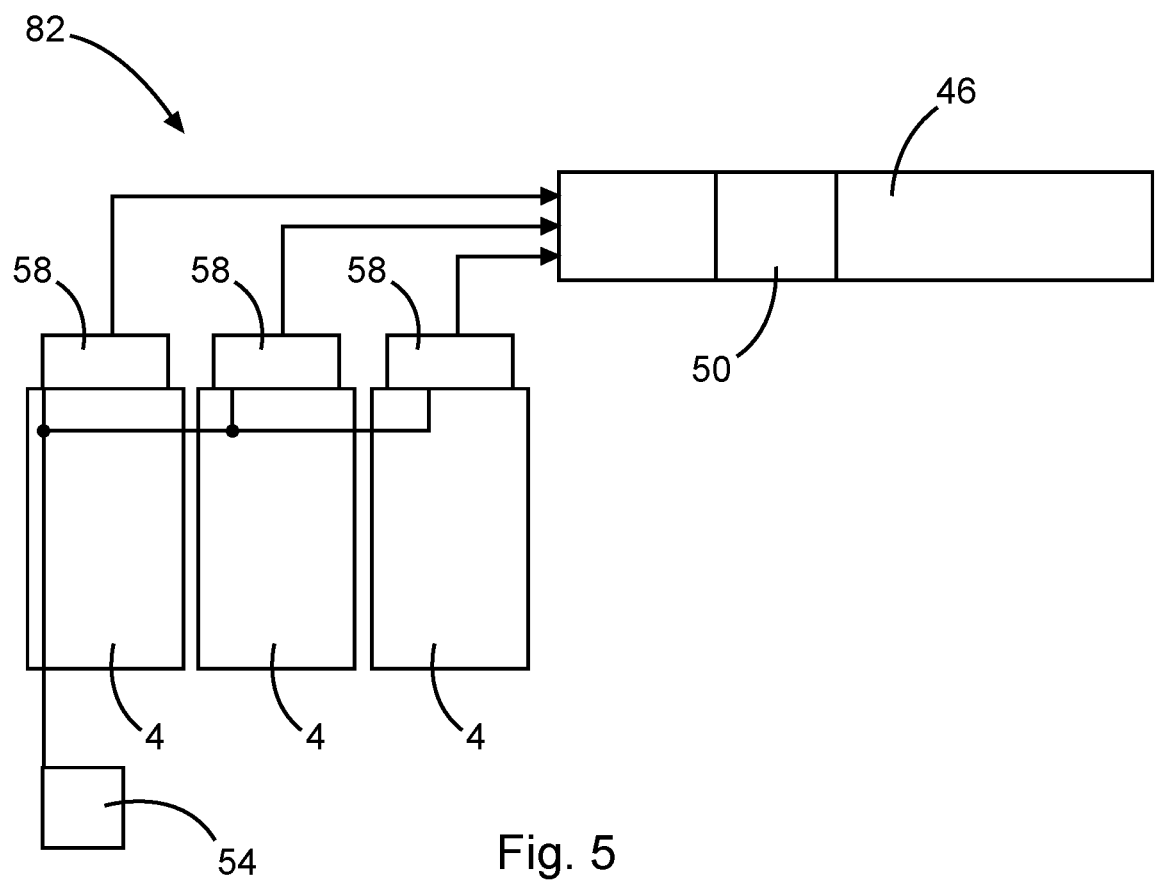

FIG. 5 shows a combination, illustrated only in a schematic manner, of a plurality of fuel cell stacks 4 in the fuel cell system 82, wherein each fuel cell stack 4, by way of example, is equipped with a purging valve 58. The individual purging valves 58 are fluidically connected to the oxidation catalyst 50 such that hydrogen contained in the purging gases is converted directly into water by air. The control unit 54 can sequentially actuate the purging valves such that the purging valves 58 open and close in a specific order, in particular opening successively and particularly preferably not simultaneously. In this way, an approximately consistent, additional input of hydrogen into the oxidation catalyst can take place, this leading to approximately consistent additional heating.

Figure 6:
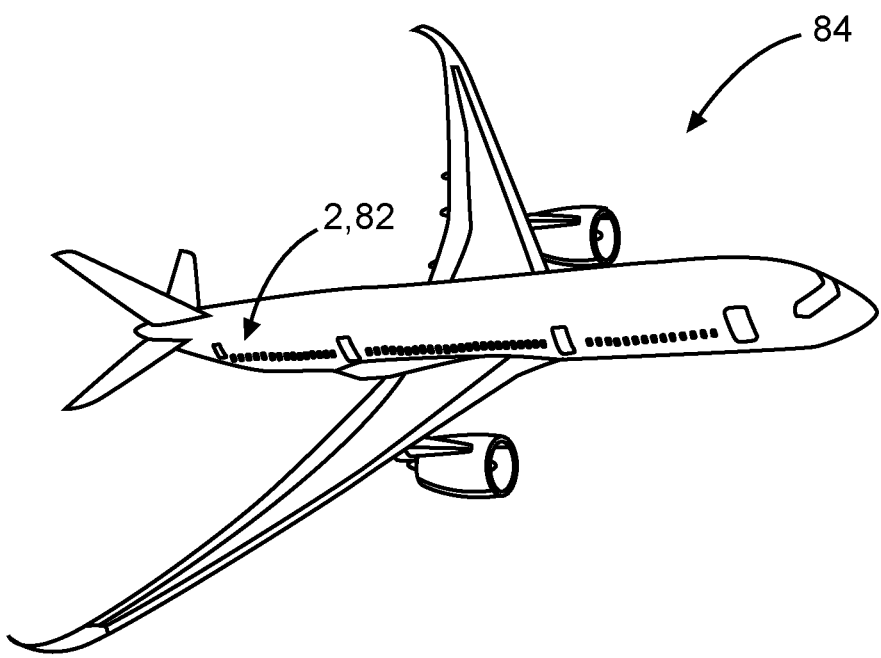
FIG. 6 shows an aircraft having a fuel cell system disposed therein.

Finally, FIG. 6 shows an aircraft 84 in which a fuel cell system 2 or 82 is installed.

It should additionally be pointed out that "comprising" or "including" do not rule out other elements or steps, and "a" or "one" does not rule out a multitude. It should also be pointed out that features or steps that have been described with reference to one of the above exemplary embodiments can also be used in combination with other features or steps of other above-described exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

2 Fuel cell system
4 Fuel cell stack
6 Anode side
8 Cathode side
10 Heat transfer element
12 Terminal
14 Anode inlet
16 Hydrogen source
18 Hydrogen connector
20 Hydrogen valve
22 Air source
24 Humidifier
26 Cathode inlet
28 Cathode outlet
30 Pump
32 Coolant inlet
34 Coolant outlet
36 Heat exchanger
38 Housing
40 Housing purging air inlet
42 Air-conveying installation
44 Housing purging air outlet
46 Outlet pipe
48 Flashback arrester
50 Oxidation catalyst
52 Temperature sensor
54 Control unit
56 Hydrogen sensor
58 Purging valve
60 Anode outlet
62 Outlet
64 Mixing point
66 Recirculation fan
68 Water separator
70 Leaked hydrogen
72 Intake air
74 First switch-off valve
76 Second switch-off valve
78 Water separator
80 Electric load
82 Fuel cell system
84 Aircraft

The invention claimed is:
1. A fuel cell system, comprising
at least one fuel cell stack having a cathode side and an anode side,
a housing which surrounds the at least one fuel cell stack,
a housing purging air inlet,
an air-conveying installation which is disposed on the housing purging air inlet,
a housing purging air outlet,
an oxidation catalyst,
at least one temperature sensor,
a control unit, and
an anode purging device, coupled to the control unit, for purging the anode side of the at least one fuel cell stack,
wherein the air-conveying installation is configured to continuously direct an airflow into the housing purging air inlet,
wherein the oxidation catalyst is disposed downstream of the housing purging air outlet and is configured to catalytically combust hydrogen and oxygen,
wherein the at least one temperature sensor is disposed on the oxidation catalyst and is configured to detect a temperature of the oxidation catalyst as an item of information pertaining to a volumetric flow of hydrogen that occurs outside a fuel cell process and is to be discharged, and
wherein the control unit is coupled to the at least one temperature sensor and to the air-conveying installation and is configured to receive a temperature detected by the at least one temperature sensor and to therefrom determine variations of a concentration of hydrogen or to determine a concentration of hydrogen, wherein the anode purging device has at least one purging valve which is disposed between an anode outlet and the oxidation catalyst, and wherein the control unit, by selectively opening the at least one purging valve, is configured to direct a flow of hydrogen through the anode side to the oxidation catalyst, to purge the anode side, wherein the at least one fuel cell stack comprises a plurality of fuel cell stacks, wherein the at least one purging valve comprises a plurality of purging valves, each of which is fluidically connected between a different fuel cell stack and the oxidation catalyst, and wherein the control unit is configured to open the plurality of purging valves at least one of successively or not simultaneously.

2. The fuel cell system as claimed in claim 1, wherein the at least one temperature sensor is disposed in an outlet pipe which directly succeeds the oxidation catalyst.

3. The fuel cell system as claimed in claim 1, further comprising a flashback arrester which is disposed upstream of the oxidation catalyst and is configured to prevent any ignition of hydrogen upstream of the flashback arrester.

4. The fuel cell system as claimed in claim 1, wherein the control unit is configured to determine from a measured temperature of the at least one temperature sensor a momentary concentration of hydrogen of a gas mixture flowing into the oxidation catalyst.

5. The fuel cell system as claimed in claim 1, wherein the control unit is configured to influence an operation of the air-conveying installation as a function of the concentration of hydrogen determined by the control unit.

6. The fuel cell system as claimed in claim 1, wherein the control unit is configured to influence the operation of the air-conveying installation as a function of the concentration of hydrogen determined by the control unit, and wherein the control unit is configured to at least temporarily close the at least one purging valve, and, with the at least one purging valve closed, to determine a momentary concentration of hydrogen in the interior of the housing.

7. The fuel cell system as claimed in claim 6, wherein the control unit is configured to compare the momentary concentration of hydrogen in the interior of the housing with a tolerable value, and, if the tolerable value is exceeded, to increase a volumetric flow of air provided by the air-conveying installation.

8. The fuel cell system as claimed in claim 6, wherein the control unit is configured to operate the fuel cell system with a reduced output if the momentary concentration of hydrogen in the interior of the housing exceeds a pre-definable threshold value.

9. A vehicle comprising at least one fuel cell system as claimed in claim 1.

10. The vehicle as claimed in claim 9, wherein the vehicle is an aircraft.

* * * * *